(12) United States Patent
Schwarz

(10) Patent No.: US 10,590,952 B2
(45) Date of Patent: Mar. 17, 2020

(54) NACELLE ASSEMBLY

(71) Applicant: UNITED TECHNOLOGIES CORPORATION, Farmington, CT (US)

(72) Inventor: Frederick M. Schwarz, Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 336 days.

(21) Appl. No.: 14/804,728

(22) Filed: Jul. 21, 2015

(65) Prior Publication Data

US 2017/0023012 A1     Jan. 26, 2017

(51) Int. Cl.
| | | |
|---|---|---|
| F01D 25/24 | (2006.01) | |
| F04D 19/00 | (2006.01) | |
| F04D 29/52 | (2006.01) | |
| F04D 29/54 | (2006.01) | |
| F02C 7/04 | (2006.01) | |
| B64D 33/02 | (2006.01) | |
| F02K 3/06 | (2006.01) | |
| F04D 29/38 | (2006.01) | |

(52) U.S. Cl.
CPC .......... *F04D 29/526* (2013.01); *B64D 33/02* (2013.01); *F01D 25/243* (2013.01); *F01D 25/246* (2013.01); *F02C 7/04* (2013.01); *F02K 3/06* (2013.01); *F04D 19/002* (2013.01); *F04D 29/38* (2013.01); *F04D 29/542* (2013.01); *F05B 2220/303* (2013.01); *F05B 2230/80* (2013.01); *F05B 2250/60* (2013.01); *F05D 2240/14* (2013.01)

(58) Field of Classification Search
CPC ...... F01D 25/243; F04D 19/002; F04D 29/38; F04D 29/526; F04D 29/542; F05B 2220/30; F05B 2220/80; F05B 2240/14; F05B 2250/60; F02C 7/04; B64D 33/02
See application file for complete search history.

(56) References Cited

U.S. PATENT DOCUMENTS

| | | | | |
|---|---|---|---|---|
| 4,271,666 A | * | 6/1981 | Hurley | F02K 1/825 |
| | | | | 415/116 |
| 5,860,276 A | * | 1/1999 | Newton | B64D 27/18 |
| | | | | 60/226.1 |
| 6,725,542 B1 | * | 4/2004 | Maguire | B64D 33/02 |
| | | | | 29/889.1 |
| 7,090,165 B2 | | 8/2006 | Jones et al. | |

(Continued)

FOREIGN PATENT DOCUMENTS

| | | |
|---|---|---|
| EP | 0921293 A1 | 6/1999 |
| EP | 2628919 A2 | 8/2013 |

(Continued)

OTHER PUBLICATIONS

European Search Report for EP 16 18 0579.

*Primary Examiner* — Deming Wan
(74) *Attorney, Agent, or Firm* — Cantor Colburn LLP

(57) ABSTRACT

The present disclosure relates generally to a fan nacelle assembly circumferentially surrounding a fan section, the fan nacelle assembly including an inner wall including an inner wall axial length, and an outer wall an outer wall axial length, wherein the outer wall axial length is greater than the inner wall axial length.

12 Claims, 5 Drawing Sheets

(56) References Cited

U.S. PATENT DOCUMENTS

| | | | | |
|---|---|---|---|---|
| 8,197,191 B2* | 6/2012 | Binks | ...................... | B64D 29/08 |
| | | | | 415/119 |
| 8,769,924 B2* | 7/2014 | Cloft | ...................... | F01D 21/045 |
| | | | | 137/15.1 |
| 2009/0064684 A1* | 3/2009 | Cloft | ...................... | B64D 27/16 |
| | | | | 60/796 |
| 2010/0276007 A1* | 11/2010 | Hendricks | ................. | F02C 7/04 |
| | | | | 137/15.1 |
| 2013/0332011 A1* | 12/2013 | Ziarno | ............... | G05B 23/0213 |
| | | | | 701/3 |

FOREIGN PATENT DOCUMENTS

| | | | |
|---|---|---|---|
| WO | 20140151097 | A1 | 9/2014 |
| WO | 20140200571 | A2 | 12/2014 |
| WO | 2015006445 | A1 | 1/2015 |

* cited by examiner

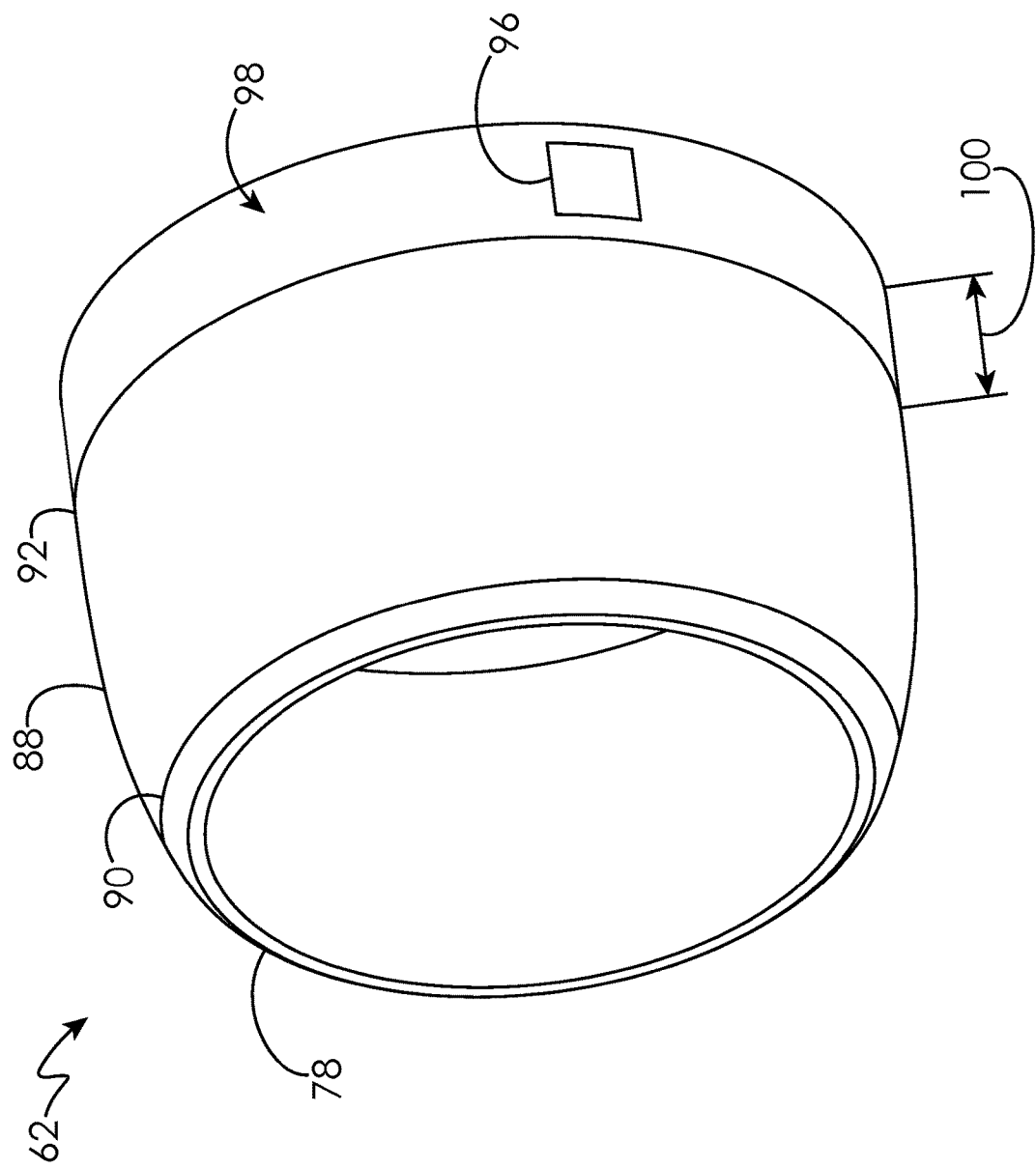

NACELLE ASSEMBLY

TECHNICAL FIELD OF THE DISCLOSED EMBODIMENTS

The present disclosure is generally related to gas turbine engines and, more specifically, a nacelle assembly.

BACKGROUND OF THE DISCLOSED EMBODIMENTS

Gas turbine engines, such as turbofan gas turbine engines, typically include a core engine having a fan section, a compressor section, a combustor section and a turbine section. During operation, air is pressurized in the compressor section and mixed with fuel in the combustor section for generating hot combustion gases. The hot combustion gases flow through the turbine section which extracts energy from the hot combustion gases to power the compressor section and drive the fan section.

The core engine is generally surrounded by a nacelle assembly that is annularly disposed about the core engine. The nacelle assembly and the engine casing structure cooperate to assemble the gas turbine engine. Typically, an inlet lip assembly of the nacelle assembly is attached to an A-flange disposed about the fan section of the core engine. A fan containment case ("FCC") is attached to an opposite side of the A-flange from the inlet lip assembly. The A-flange permits assembly/disassembly of the inlet lip assembly from the FCC. In addition, an engine electronic control is typically mounted aft of the fan containment case, such as on the fan case.

The current location of the split between the inlet lip assembly and the FCC creates laminar turbulence, and may negatively affect gas turbine engine efficiency and fuel consumption. Accordingly, improvements in the nacelle assembly are therefore needed in the art.

SUMMARY OF THE DISCLOSED EMBODIMENTS

In one aspect, a fan section of a turbine engine is provided. The fan section includes a fan containment case within which a plurality of fan blades are contained. The fan containment case is enclosed within an aerodynamic fan nacelle that at least partially surrounds an aerodynamic core nacelle. The fan containment case and aerodynamic fan nacelle are supported by circumferentially spaced structures.

The fan containment case includes a first casing coupling member located on an outer surface forward of the fan blades, and a second casing coupling member located on the outer surface aft of the circumferentially spaced structures. In an embodiment, an engine accessory, including an accessory axial length, is affixed to the outer surface of the fan containment case. In one embodiment, the engine accessory includes an electronic engine control.

The fan nacelle includes an inlet assembly operably coupled to a first nacelle flange. The fan nacelle further includes an inner wall and an outer wall. The inner wall includes an inner wall forward end, an inner wall aft end, and an inner wall axial length. The inner wall aft end is configured to be operably coupled to the first casing coupling member.

The outer wall includes an outer wall forward end, an outer wall aft end, and an outer wall axial length. In an embodiment, the outer wall is monolithic. In one embodiment, the outer wall aft end is configured to be operably coupled to the second casing coupling member.

In another embodiment, the fan nacelle includes a fan compartment cowling panel including a panel axial length. The fan cowl panel is operably coupled to the outer wall aft end and the second casing coupling member. In an embodiment, the panel axial length is less than or equal to approximately three times the accessory axial length.

In one embodiment, the fan compartment cowling panel includes an access opening disposed therein, wherein the access opening is located adjacent to the engine accessory.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein:

FIG. 5 is a perspective view of one example nacelle assembly.

DETAILED DESCRIPTION OF THE DISCLOSED EMBODIMENTS

Figure 1:
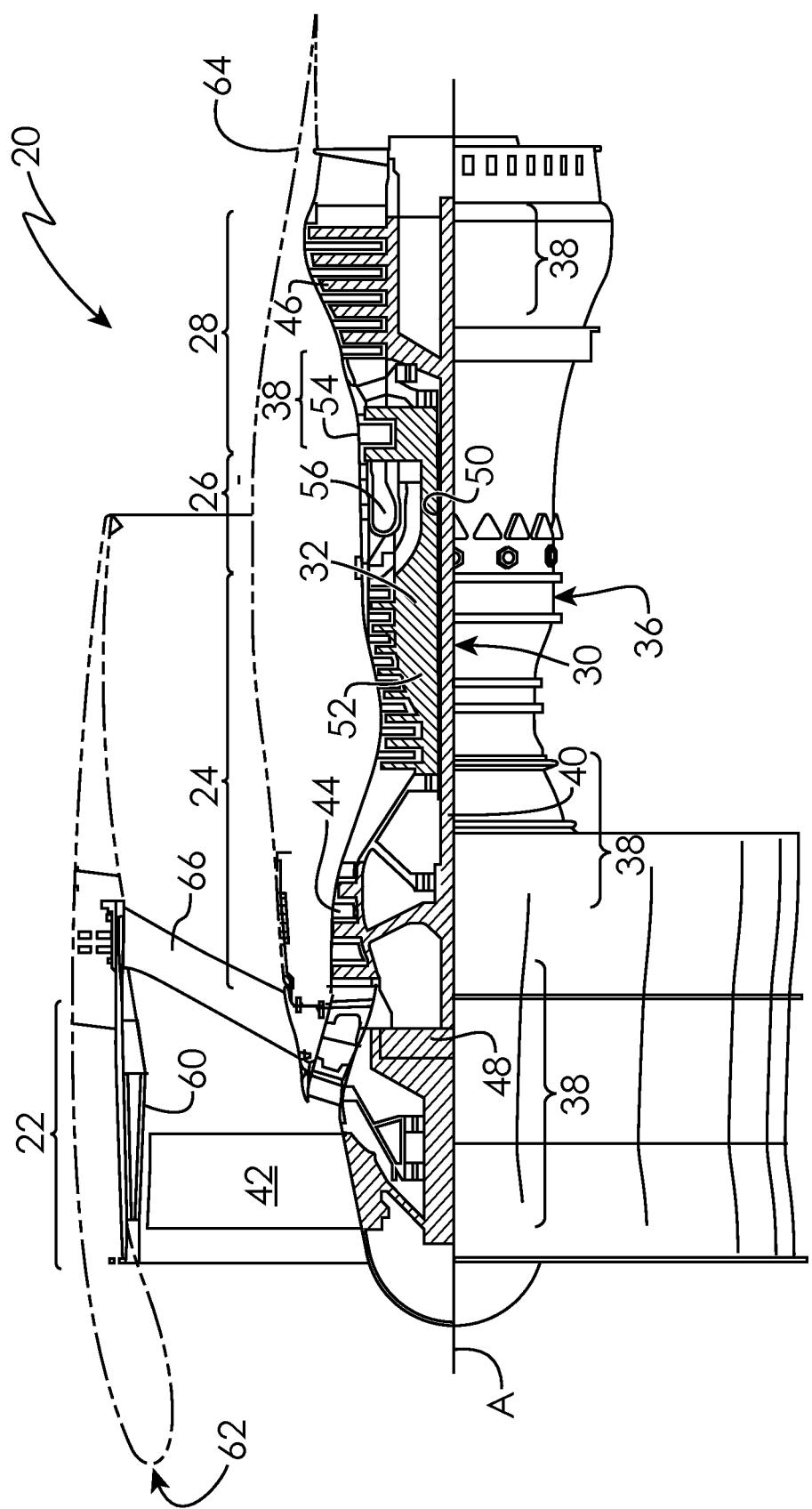
FIG. 1 is a sectional view of one example turbine engine.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft. (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

The fan section 22 generally includes a fan containment case 60 within which the fan blades 42 are contained. The fan containment case 60 is enclosed within an aerodynamic fan nacelle 62 (illustrated schematically) that at least partially surrounds an aerodynamic core nacelle 64 (illustrated schematically). The fan containment case 60 and aerodynamic fan nacelle 62 are supported by circumferentially spaced structures 66 often referred to as Fan Exit Guide Vanes (FEGVs).

Figure 2:
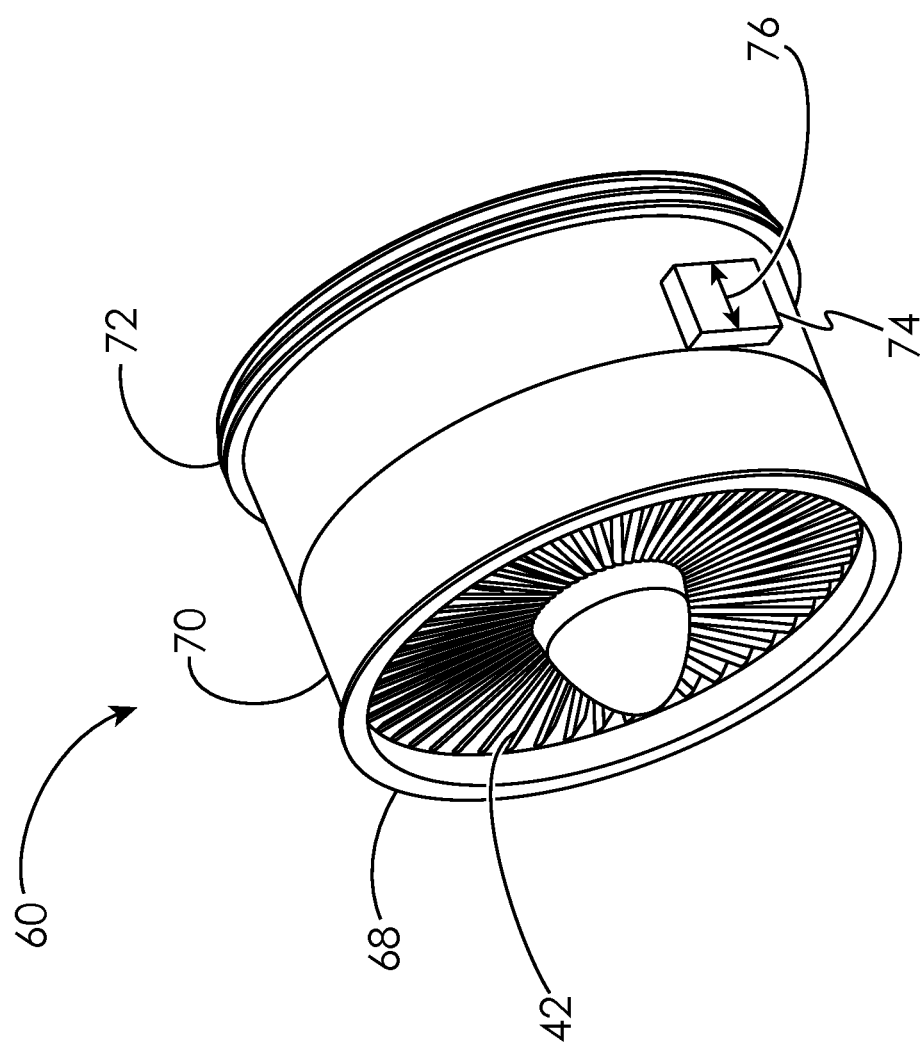
FIG. 2 is a perspective view of one example turbine engine.

As shown in FIG. 2, the fan containment case 60 includes a first casing coupling member 68, for example a flange, located on an outer surface 70 forward of the fan blades 42, and a second casing coupling member 72 located on the outer surface 70 aft of the circumferentially spaced structures 66 (not shown in FIG. 2). It will be appreciated that the second casing coupling member 66 may be a flange or V-groove to name a couple of non-limiting examples. In an embodiment, an engine accessory 74, including an accessory axial length 76, is affixed to the outer surface 70 of the fan containment case 60. In one embodiment, the engine accessory 74 includes an electronic engine control.

Figure 3:
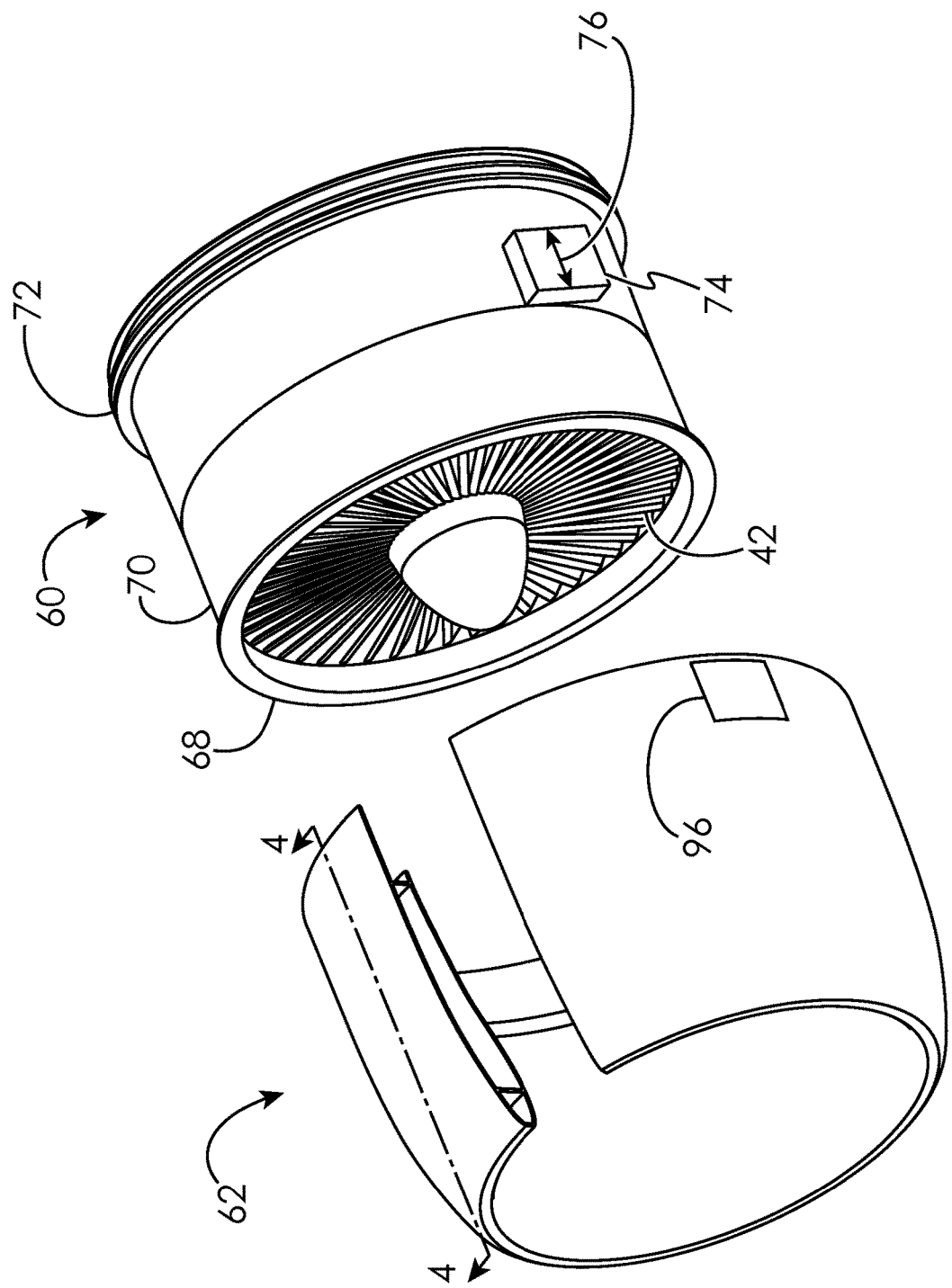
FIG. 3 is a perspective view of one example turbine engine and a fan nacelle.
Figure 4:
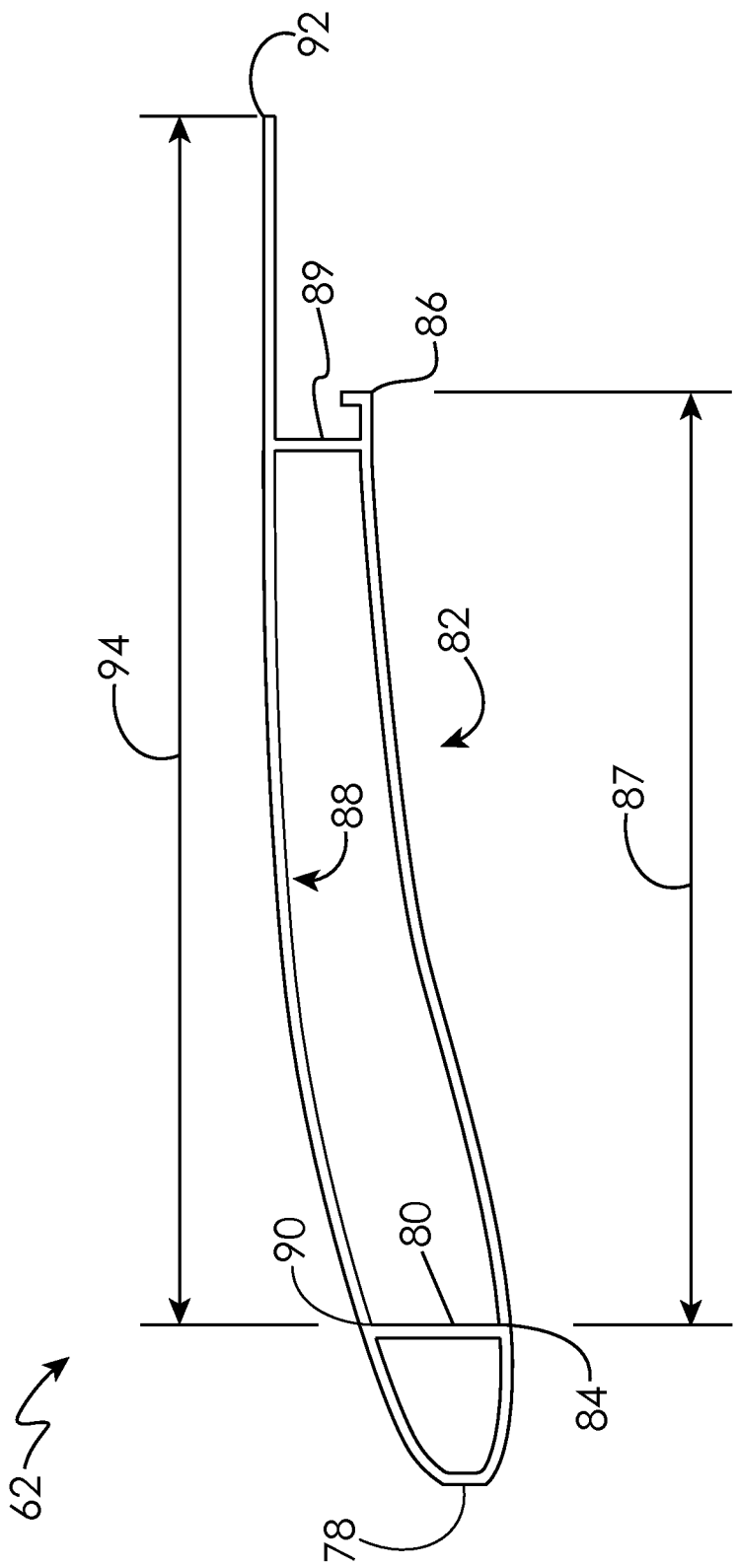
FIG. 4 is a cross-sectional view of a nacelle assembly according to one embodiment of the present disclosure.

As shown in FIGS. 3 and 4, the fan nacelle 62 includes an inlet assembly 78 operably coupled to a first nacelle flange 80. The fan nacelle 62 further includes an inner wall 82; the inner wall 82 including an inner wall forward end 84, an inner wall aft end 86, and an inner wall axial length 87. The inner wall forward end 84 is operably coupled to the first nacelle flange 80. The inner wall aft end 86 is configured to be operably coupled to the first casing flange 68.

The fan nacelle 62 further includes an outer wall 88; the outer wall 88 including an outer wall forward end 90, an outer wall aft end 92, and an outer wall axial length 94. In an embodiment, the outer wall 88 is monolithic. The outer wall forward end 90 is operably coupled to the first nacelle flange 80. In one embodiment, the outer wall aft end 92 is configured to be operably coupled to the second casing coupling member 72. As shown, the outer wall axial length 94 is greater than the inner wall axial length 87. It will be appreciated that the fan nacelle 62 may have one or more support flanges 89 to provide stability between the inner wall 82 and the outer wall 88.

In this embodiment, the outer wall 88 includes at least one access opening 96 (shown in FIG. 3) disposed therein. For example, the at least one access opening 96 may include a small door, hatch or a panel capable of sliding in any direction to name a few non-limiting examples. The at least one access opening 96 may be positioned adjacent to the engine accessory 74 to provide maintenance access thereto. It will be appreciated that multiple accesses openings 96 may be disposed in the outer wall to gain access to other accessories and/or wiring affixed to the outer surface 70 of the fan containment case 60

In another embodiment, as shown in FIG. 5, the fan nacelle 62 includes a fan compartment cowling panel 98 including a panel axial length 100. The fan compartment cowling panel 98 is operably coupled to the outer wall aft end 92 and the second casing coupling member 72. In an embodiment, the panel axial length 100 is less than or equal to approximately three times the accessory axial length 76. For example, if the engine accessory 74 has an accessory axial width 76 of approximately 13 inches (approximately 33 cm); then, the fan compartment cowling panel 98 would have a panel axial width 100 less than or equal to approximately 39 inches (99 cm).

In one embodiment, the fan compartment cowling panel 98 includes an access opening 96 disposed therein, wherein the access opening 96 is located adjacent to the engine accessory 74. For example, the access opening 96 may include a small door, hatch or a panel capable of sliding in any direction, to name a few non-limiting examples. The access opening 96 may be positioned adjacent to the engine accessory 74 to provide maintenance access thereto.

It will be appreciated that by having an outer wall aft end 92 positioned aft of the first casing coupling member 68, the laminar flow of air is more continuous over the fan nacelle 62; thus, reducing laminar turbulence and improving performance of the turbine engine 20.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A gas turbine engine including a fan section, the fan section comprising:
    a plurality of fan blades;
    a plurality of guide vanes positioned aft of the plurality of fan blades;
    a fan containment case circumferentially surrounding the plurality of fan blades and the plurality of guide vanes, the fan containment case comprising a first flange located on an outer surface of the fan containment case forward of the plurality of fan blades, and a second flange located on the outer surface of the fan containment case aft of the plurality of guide vanes;
    a fan nacelle assembly circumferentially surrounding the fan containment case, the fan nacelle assembly comprising:
    an inner wall including an inner aft end, the inner aft end being secured to the first flange; and
    a monolithic outer wall defining an outer surface of the fan nacelle assembly and including an outer wall aft end, the outer wall aft end being positioned aft of the first flange and is secured to the second flange, wherein an axial length of the monolithic outer wall is greater than an axial length of the inner wall.

2. The gas turbine engine of claim 1, further comprising an engine accessory affixed to the outer surface of the fan containment case, wherein the engine accessory includes an accessory axial length.

3. The gas turbine engine of claim 2, wherein the outer wall further comprises an access opening disposed therein, wherein the access opening is located adjacent to the engine accessory.

4. The gas turbine engine of claim 2, wherein the fan nacelle assembly further comprises a fan compartment cowling panel secured to the outer wall aft end and the second flange, wherein the fan cowl panel includes a panel axial length.

5. The gas turbine engine of claim 4, wherein the panel axial length is less than or equal to approximately three times the accessory axial length.

6. The gas turbine engine of claim 4, wherein the fan compartment cowling panel further comprises an access opening disposed therein, wherein the access opening is located adjacent to the engine accessory.

7. A gas turbine engine including a fan section, the fan section comprising:
    a plurality of fan blades;
    a plurality of guide vanes positioned aft of the plurality of fan blades;
    a fan containment case circumferentially surrounding the plurality of fan blades and the plurality of guide vanes, the fan containment case comprising a first flange located on an outer surface of the fan containment case forward of the plurality of fan blades, and a V-groove located on the outer surface of the fan containment case aft of the plurality of guide vanes; a fan nacelle assembly circumferentially surrounding the fan containment case, the fan nacelle assembly comprising:
    an inner wall including an inner aft end, the inner aft end being secured to the first flange; and
    a monolithic outer wall defining an outer surface of the fan nacelle assembly and including an outer wall aft end, the outer wall aft end is positioned aft of the first flange and is secured to the V-groove, wherein an axial length of the monolithic outer wall is greater than an axial length of the inner wall.

8. The gas turbine engine of claim 7, further comprising an engine accessory affixed to the outer surface of the fan containment case, wherein the engine accessory includes an accessory axial length.

9. The gas turbine engine of claim 8, wherein the outer wall further comprises an access opening disposed therein, wherein the access opening is located adjacent to the engine accessory.

10. The gas turbine engine of claim 8, wherein the fan nacelle assembly further comprises a fan compartment cowling panel operably coupled to the outer wall aft end and the V-groove, wherein the fan cowl panel includes a panel axial length.

11. The gas turbine engine of claim 10, wherein the panel axial length is less than or equal to approximately three times the accessory axial length.

12. The gas turbine engine of claim 10, wherein the fan compartment cowling panel further comprises an access opening disposed therein, wherein the access opening is located adjacent to the engine accessory.

\* \* \* \* \*